US007330344B2

(12) United States Patent
Gaessler et al.

(10) Patent No.: US 7,330,344 B2
(45) Date of Patent: Feb. 12, 2008

(54) METHOD FOR DRIVING ACTUATORS

(75) Inventors: Hermann Gaessler, Vaihingen (DE); Juergen Schiemann, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 553 days.

(21) Appl. No.: 10/849,666

(22) Filed: May 20, 2004

(65) Prior Publication Data

US 2004/0263106 A1 Dec. 30, 2004

(30) Foreign Application Priority Data

May 23, 2003 (DE) ................................ 103 23 489

(51) Int. Cl.

*H02H 9/00* (2006.01)
*H02H 47/00* (2006.01)
*H02H 51/22* (2006.01)
*H02H 51/30* (2006.01)
*H01H 47/00* (2006.01)
*H01H 47/14* (2006.01)
*H01H 47/32* (2006.01)

(52) U.S. Cl. ...................... 361/160; 361/166; 361/167; 361/168.1

(58) Field of Classification Search ................ 361/160, 361/166, 167, 168.1
See application file for complete search history.

(56) References Cited

U.S. PATENT DOCUMENTS 6,845,300 B2 * 1/2005 Haghgooie et al. ......... 700/289

* cited by examiner

*Primary Examiner*—Michael Sherry
*Assistant Examiner*—Dharti H Patel
(74) *Attorney, Agent, or Firm*—Kenyon & Kenyon LLP

(57) ABSTRACT

A method for driving a plurality of actuators having an output stage having multiple channels, by way of whose channels boost currents are conveyed to the actuators. In this method, a check is made as to whether rising edges of multiple boost currents are present simultaneously (rising edge collision). Upon the identification of simultaneously present rising edges, at least one of the boost currents is conveyed in time-offset fashion to the associated actuator.

12 Claims, 4 Drawing Sheets

METHOD FOR DRIVING ACTUATORS

FIELD OF THE INVENTION

The present invention relates to a method for driving actuators.

BACKGROUND INFORMATION

"Actuators" are to be understood, for purposes of this application, as electrical components or even assemblies that are driven by current pulses or voltage pulses. Solenoid valves, or actuators of an electrohydraulic valve control (EHVC) system, may be mentioned merely by way of example. The task often arises of driving a plurality of such actuators substantially simultaneously. Systems for multi-channel pulse generation to drive multiple actuators or their output stages, for example for ignition and fuel injection in motor vehicles, are already known in a variety of embodiments. In so-called boost output stages, the delivery of high power levels is required, albeit often only briefly. In this context, a rapid but only brief current superelevation typically ensures rapid and reliable energization of solenoid valves while simultaneously minimizing the electrical power expended. An additional voltage supply device with a higher voltage is usually needed to achieve a rapid current buildup. This higher voltage (boost voltage) is often made available by way of a DC/DC converter. The problem occurring here is that depending on the current load required, only very expensive and high-quality components can be used. The simultaneous activation of multiple output stages, or the driving of a plurality of actuators, is nevertheless a critical operation. One possible solution to the problem might lie in the use of charge storage devices, in particular high-capacitance capacitors, that can supply the high current demand after being appropriately charged. The large physical volume and high price of these electrical components is, however, disadvantageous.

SUMMARY

The present invention proceeds from the recognition that, especially for applications in automotive engineering, absolutely simultaneous driving of all the actuators that are to be driven is not necessarily required. In the case of multi-channel output devices for pulsed driving of a plurality of actuators, it may instead be entirely tolerable for small time shifts to occur between the pulses. This allows the avoidance of so-called "rising edge collisions," understood as the simultaneous occurrence of activation edges on multiple channels. Advantageously, the maximum load can thereby be reduced, because the current intensity occurring is lower than in the case of simultaneous driving of all actuators. This eliminates the need for overdimensioning of an output stage or of a power supply device that is supplying the required current, for example a DC/DC converter or capacitors, and thus results in a considerable cost saving.

BRIEF DESCRIPTION OF THE DRAWINGS

The present invention is explained in more detail below with reference to the drawings and example embodiment.

DETAILED DESCRIPTION OF EXAMPLE EMBODIMENTS

Figure 1:
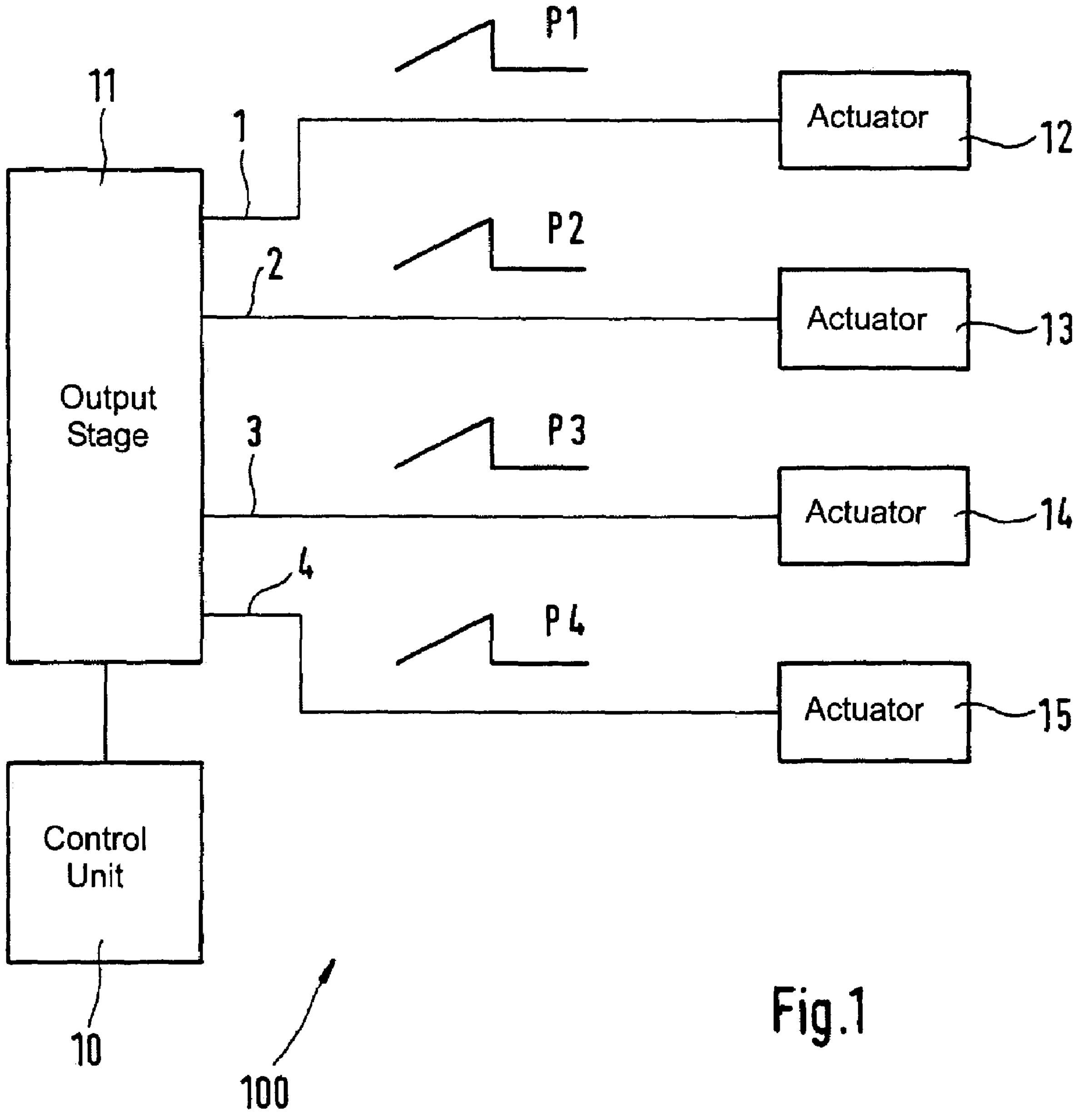
FIG. 1 shows a first block diagram schematically depicting an electronic device.

FIG. 1 is a first block diagram schematically depicting an electronic device 100 for driving actuators. Device 100 encompasses a control unit 10 that is connected to a multi-channel output stage 11. Multiple channels, for example channels 1, 2, 3, 4, of output stage 11 are connected to a plurality of actuators 12, 13, 14, 15. These actuators can be, for example, electromagnetic injection valves for controlling fuel delivery in a motor vehicle, or solenoid valves in connection with braking or steering devices of a motor vehicle, or a control system for the gas exchange valves of an internal combustion engine. Actuators 12, 13, 14, 15 are driven by pulses P1, P2, P3, P4 that are supplied by output stage 11.

Figure 2:
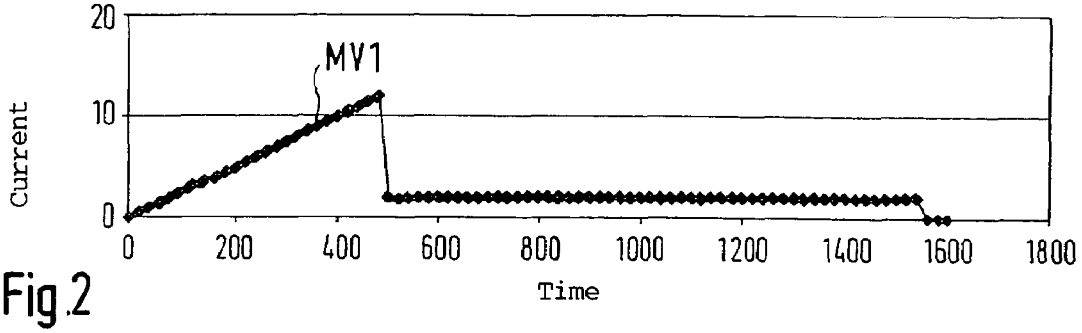
FIG. 2 shows a first diagram depicting a current profile as a function of time.

FIG. 2 is a first diagram depicting a current profile MV1 as a function of time. This is a typical current profile that occurs when an actuator, for example a solenoid valve, is driven. Time units, for example milliseconds, are plotted on the X axis. Current units, for example A, are plotted on the Y axis. Current MV1 is switched on at time 0. As FIG. 2 shows, current MV1 then rises sharply in a relatively short time until the solenoid valve is completely open after approximately 430 milliseconds. This phase is often referred to as the "boost phase." After opening of the solenoid valve, current MV1 can then be decreased to a substantially lower value, the so-called holding current, since this is sufficient to hold the solenoid valve open. This phase during which the smaller holding current is present is also referred to as the "holding phase." When the solenoid valve is to be closed again, which is the case in FIG. 1, e.g., after approximately 1600 milliseconds, current MV1 is reduced to zero.

Figure 3:
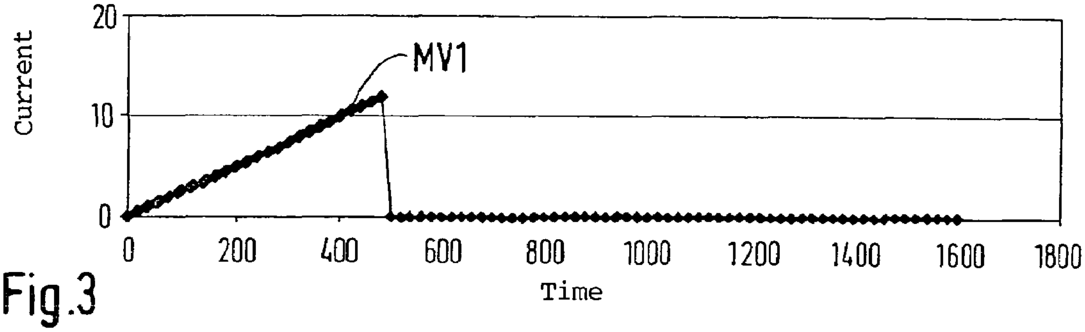
FIG. 3 shows a second diagram depicting a current profile as a function of time.

FIG. 3 is a second diagram depicting a current profile as a function of time. This diagram depicts the so-called "boost current" that is present at the solenoid valve in the boost phase, i.e., approximately in the time interval between zero and 450 milliseconds. After completion of the boost phase, only the holding current is then present, as depicted in FIG. 2. A problem for the performance of output stage 11 occurs when all actuators 12, 13, 14, 15 (FIG. 1) need to be energized substantially simultaneously. This is illustrated by way of FIG. 4, which is a third diagram depicting a current profile as a function of time.

Figure 4:
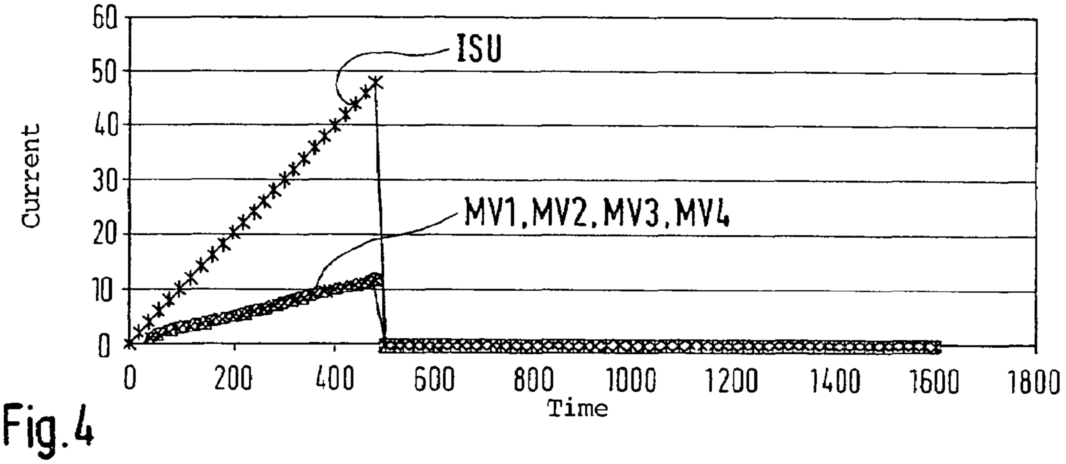
FIG. 4 shows a third diagram depicting a current profile as a function of time.

FIG. 4 depicts the boost currents MV1, MV2, MV3, MV4 of a total of four actuators 12, 13, 14, 15. It is assumed in this example that all four actuators 12, 13, 14, 15 are energized simultaneously and that the actuators are impinged upon at time T=0 by substantially the same boost current for each of the actuators. The boost current begins to flow at time T=0 and decreases again after a period of approximately 500 ms when actuators 12, 13, 14, 15 are activated. The problem becomes evident when considering total current ISU obtained by summing the individual boost currents MV1, MV2, MV3, MV4. Output stage 11 would thus be considerably stressed when simultaneously driving all actuators 12, 13, 14, 15.

As described above, this situation could be handled by overdimensioning output stage 11 and the power supply device, but for cost reasons it would not be economically feasible, since expensive components would need to be provided. The use of capacitors to provide the necessary current intensity is also prohibited for reasons of cost and space. For example, the power supply device could also be implemented by using a DC/DC converter.

Figure 5:
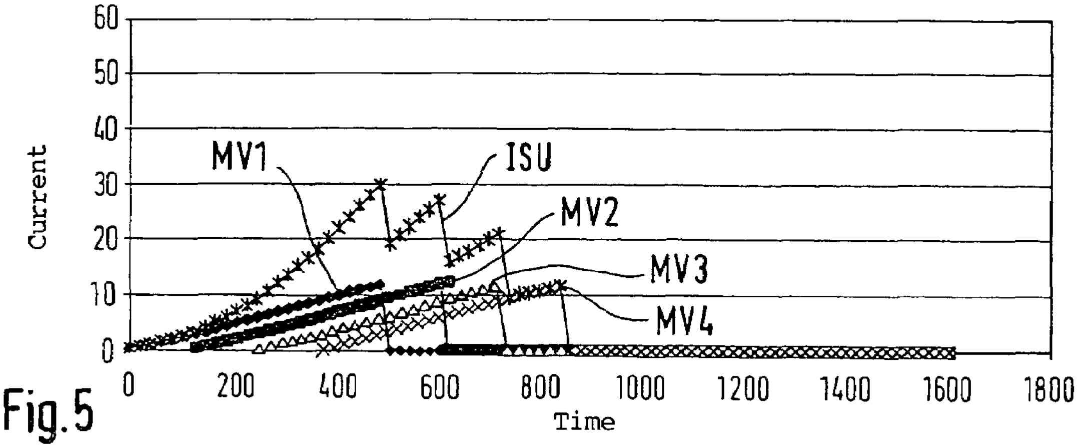
FIG. 5 shows a fifth diagram depicting a current profile as a function of time.

This problem can now be solved according to the present invention by the fact that actuators 12, 13, 14, 15 are not all driven simultaneously, but instead the boost currents are conveyed to them in time-offset fashion. This is explained with reference to a second block diagram that is presented in FIG. 6. The circuit components depicted therein correspond to those already depicted in FIG. 1. In contrast to FIG. 1, however, in FIG. 6 pulses P1, P2, P3, P4 are conveyed in time-offset fashion to the respective actuators 12, 13, 14, 15. FIG. 1 thus shows that on channel 1, pulse P1 provided for driving actuator 12 begins at time T1. On channel 2, pulse P2 provided for driving actuator 13 starts at time T2. On channel 3, pulse P3 provided for driving actuator 14 starts at time T3. On channel 4, pulse P4 provided for driving actuator 15 starts at time T4. In the exemplary embodiment depicted in FIG. 6, the aforementioned times T1, T2, T3, T4 are offset from one another by the same time interval DT. The effects of this driving mode are evident from FIG. 5, which is a fourth diagram depicting a current profile as a function of time.

Figure 6:
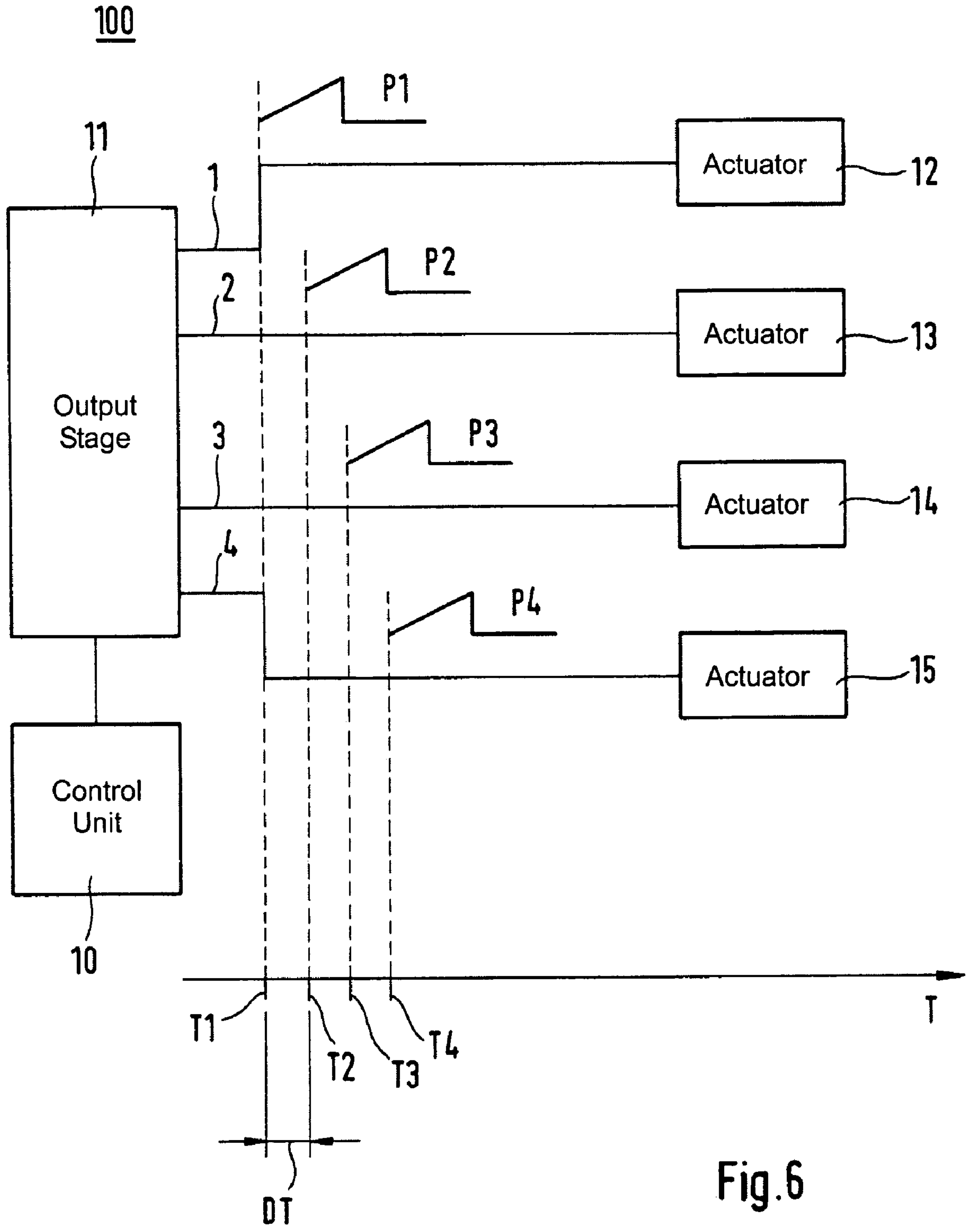
FIG. 6 shows a second block diagram.

FIG. 5 once again depicts the boost currents for the four actuators 12, 13, 14, 15 that, according to FIG. 6, are conveyed to the aforesaid actuators in time-offset fashion. Total current ISU is simultaneously depicted in FIG. 5. It is clearly evident that because of the time offset of the boost currents, a substantially lesser load on output stage 11 and on the power supply device can be expected, since it is no longer necessary to provide such a high current as in the exemplary embodiment according to FIG. 4.

In the exemplary embodiment depicted by way of example in FIG. 6, it is assumed that boost currents MV1, MV2, MV3, MV4 are conveyed to actuators 12, 13, 14, 15 in time-offset fashion, the time interval between the individual boost currents MV1, MV2, MV3, MV4 being substantially constant and having the value DT. In the context of a further variant embodiment of the invention, it is certainly possible also to configure time interval DT variably, so that the time interval between the beginnings of the respective boost currents MV1, MV2, MV3, MV4 can be equalized, i.e., modified, even more effectively when that appears advisable for load reasons.

Output stage 11 having multiple channels 1, 2, 3, 4 for driving actuators 12, 13, 14, 15 can be statically configured, by appropriate circuit design, in such a way that pulses for driving actuators 12, 13, 14, 15 are outputted at a constant time interval DT when this proves necessary for reasons of load reduction. This may be the case whenever, as already mentioned above, a rising edge collision occurs. Output stage 11 accordingly has a circuit that can detect such a collision. The further exemplary embodiment of the present invention in which pulses P1, P2, P3, P4 can be conveyed to actuators 12, 13, 14, 15 with a variable time delay is, however, substantially more flexible. It is particularly advantageous to provide a control unit 10 that encompasses calculation means with which a critical rising edge collision can be identified. As soon as such a collision occurs, control unit 10 causes output stage 11 to deliver optimized, i.e. time-offset, pulses P1, P2, P3, P4 to drive actuators 12, 13, 14, 15.

Figure 7:
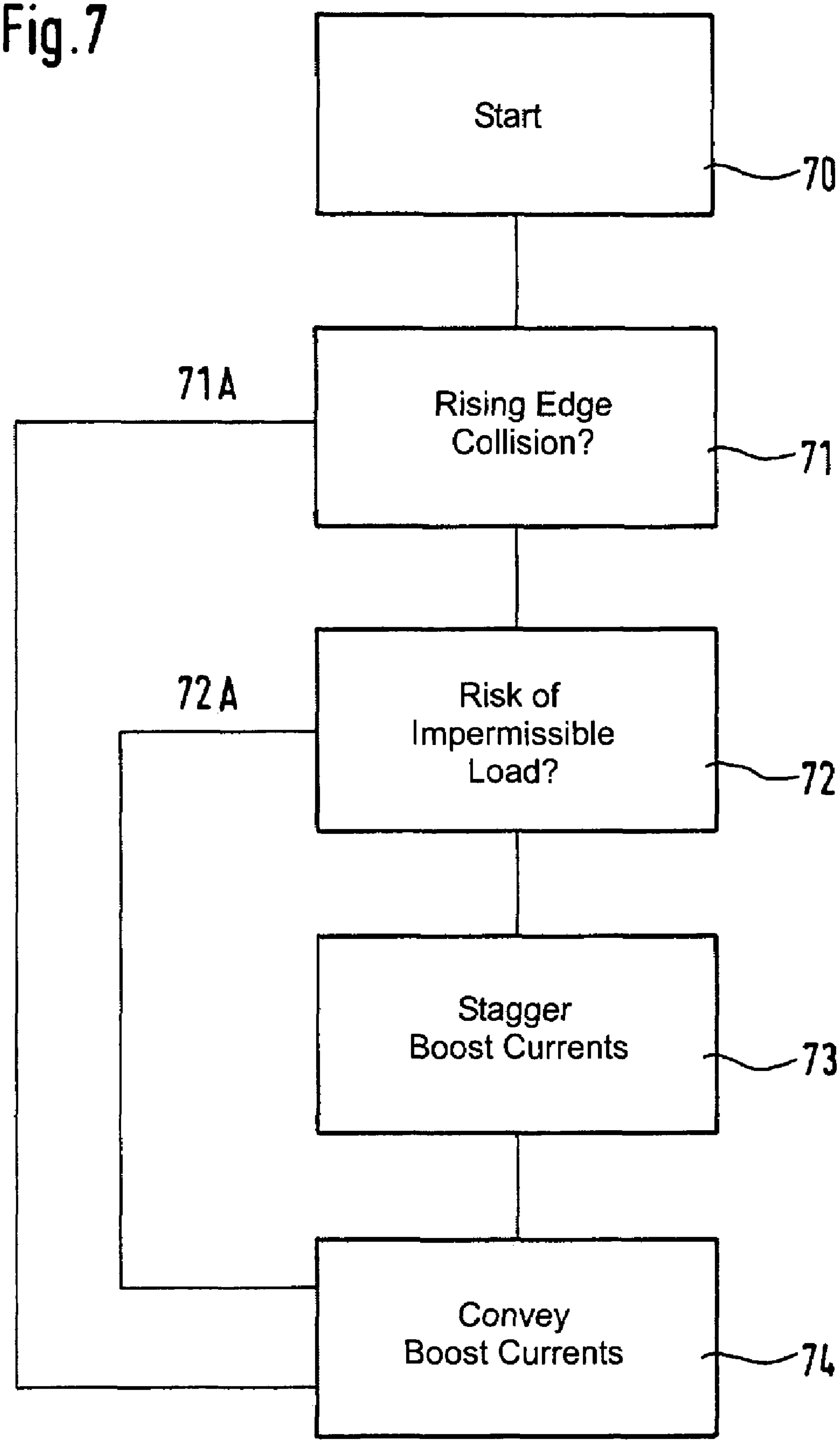
FIG. 7 shows a flow chart.

In an advantageous further variant embodiment of the present invention, after a rising edge collision has been identified an initial check is made, in an additional step, as to whether a definable load limit of devices, for example output stage 11 or power supply devices, will in fact be exceeded by boost currents MV1, MV2, MV3, MV4 to be conveyed simultaneously. Only if this is the case will provision be made for a time-offset conveyance of boost currents MV1, MV2, MV3, MV4. This variant embodiment is explained below with reference to the flow chart depicted in FIG. 7.

The checking method is started in step 70. Step 71 checks whether a rising edge collision is present, i.e., whether multiple boost currents MV1, MV2, MV3, MV4 are to be conveyed simultaneously to actuators 12, 13, 14, 15. If that is not the case, execution branches immediately via branching point 71A to step 74, which causes conveyance of boost current MV1, MV2, MV3, MV4 to the associated actuator 12, 13, 14, 15. If a rising edge collision is identified in step 71, however, step 72 then initially follows. This step checks whether possible provision of simultaneous boost currents MV1, MV2, MV3, MV4 will result in an impermissible load, i.e., whether a definable load limit G will be exceeded. If this is not the case, execution branches immediately via branching point 72A to step 74, which causes conveyance of boost current MV1, MV2, MV3, MV4 to the associated actuator 12, 13, 14, 15. If, however, there is a risk that the definable load limit G will be exceeded, then step 73 initially follows. This step causes boost currents MV1, MV2, MV3, MV4 to be staggered in time before step 74 is performed. The staggering of boost currents MV1, MV2, MV3, MV4 in time is advantageously selected in such a way that the sum of the boost currents MV1, MV2, MV3, MV4 flowing simultaneously in a definable time period does not exceed a definable limit value of total current ISU.

In an advantageous further embodiment of the present invention, a priority sequence can usefully be defined. For example, particularly time-critical actuators, i.e., actuators that must be driven in particularly accurately timed fashion, receive a higher priority than less time-critical actuators. In other words, in the driving sequence of actuators 12, 13, 14, 15 with time-offset boost currents MV1, MV2, MV3, MV4, firstly the time-critical actuators are taken into account, in such a way that those actuators are driven with no timing errors if possible or with the fewest possible timing errors. The priorities can be permanently definable or also can be modifiable from case to case, and in particular can be modifiable as a function of time or of the operating state of the machine controlled by the actuators.

In an advantageous further embodiment of the present invention, limits can also be defined for the permissible time shift in the driving of individual actuators. In this context, particularly time-critical actuators are characterized, for example, by particularly narrow limits. In the event of a rising edge collision, a sequence having time-offset boost currents to those actuators is then determined in such a way that the stipulated time shift limits are complied with. The limits of the permissible time shifts can be permanently defined or also can be modifiable from case to case, in particular as a function of time and/or of the operating state of the machine controlled by the actuators.

The approach according to the present invention is advantageously usable for all applications in which a plurality 1, 2, 3, . . . n of electromagnetic actuators, for example solenoid valves, are to be driven. There are many applications for it for use in motor vehicles, for example driving fuel injection valves or driving solenoid valves in conjunction with braking devices, steering systems, and devices for electrohydraulic or magnetic valve control. The method according to the present invention is of course also usable when devices must be impinged upon not by current but by voltages, for example control devices having piezoelectric crystals.

Application of the approach according to the present invention is of course not limited to the automotive sector. It can be used with equal benefit in other sectors of technology in which a plurality of actuators are to be driven substantially simultaneously.

REFERENCE CHARACTERS

1 Channel
2 Channel
3 Channel
4 Channel
10 Control unit
11 Output stage
12 Actuator
13 Actuator
14 Actuator
15 Actuator
100 Electronic device
P1 Pulse
P2 Pulse
P3 Pulse
P4 Pulse
ISU Total current
MV1 Boost current
MV2 Boost current
MV3 Boost current
MV4 Boost current
T Time axis
T1 Time
T2 Time
T3 Time
T4 Time
70 Step
71 Step
72 Step
73 Step
74 Step
71A Branching point
72A Branching point

What is claimed is:

1. A method for driving a plurality of actuators comprising an output stage having multiple channels, by way of whose channels boost currents are each conveyed to an associated actuator comprising:

checking as to whether rising edges of multiple boost currents are present simultaneously;

upon identifying simultaneously present rising edges, conveying at least one of the boost currents in time-offset fashion to the associated actuator; and checking as to whether simultaneous conveyance of a plurality of boost currents results in an impermissible load on a device;

wherein time-offset conveyance of boost currents to the associated actuators only if a defined load limit is exceeded by the simultaneous conveyance of the plurality of boost currents.

2. The method as recited in claim 1, wherein the at least one boost current conveyed in time-offset fashion to the associated actuator has a rising edge offset later in time.

3. The method as recited in claim 1, wherein the at least one boost current conveyed in time-offset fashion to the associated actuator has a rising edge offset earlier in time.

4. The method for driving a plurality of actuators as recited in claim 1, wherein the boost currents are conveyed to the associated actuators with a constant time delay.

5. The method for driving a plurality of actuators as recited in claim 1, wherein the boost currents are conveyed to the associated actuators with a variable time delay.

6. A method for driving a plurality of actuators comprising an output stage having multiple channels, by way of whose channels boost currents are each conveyed to an associated actuator comprising:

checking as to whether rising edges of multiple boost currents are present simultaneously;

upon identifying simultaneously present rising edges, conveying at least one of the boost currents in time-offset fashion to the associated actuator;

checking as to whether simultaneous conveyance of a plurality of boost currents results in an impermissible load on a device, wherein time-offset conveyance of boost currents to the associated actuators only if a defined load limit is exceeded by the simultaneous conveyance of the plurality of boost currents;

defining a load limit; and prior to the conveyance of the boost currents to the actuators, checking as to whether the defined load limit will be exceeded;

wherein the conveyance of boost currents to the actuators is accomplished in equalized or time-offset fashion in such a way that the defined load limit is not exceeded.

7. A method for driving a plurality of actuators comprising an output stage having multiple channels, by way of whose channels boost currents are each conveyed to an associated actuator comprising:

checking as to whether rising edges of multiple boost currents are present simultaneously; and upon identifying simultaneously present rising edges, conveying at least one of the boost currents in time-offset fashion to the associated actuator, wherein a sum of the boost currents conveyed simultaneously in a definable time interval is dimensioned in such a way that a definable limit value of the total current is not exceeded.

8. The method for driving a plurality of actuators as recited in claim 1, wherein, in the context of driving of the actuators with time-offset boost currents, defining a priority sequence in such a way that time-critical actuators are driven preferentially.

9. The method as recited in claim 1, wherein in the context of driving of the actuators with time-offset boost currents, limits for permissible time shifts are defined in such a way that actual time shifts comply with those definable limits.

10. The method as recited in claim 1, wherein priorities or a priority sequence of the actuators, and limits of the permissible time shifts of the boost currents to the actuators, are defined from case to case, as a function of at least one of time and an operating state of a machine controlled by the actuators.

11. The method as recited in claim 1, wherein the method is carried out by electrical and electronic components.

12. The method as recited in claim 1, wherein the method is carried out by way of functional modules of an electronic computation unit.

* * * * *